United States Patent [19]

Kudo

[11] 4,252,245
[45] Feb. 24, 1981

[54] SEALING STRUCTURE FOR RECEIVING GAS-FILLER HOSE IN A VEHICLE

[75] Inventor: Michio Kudo, Yokohama, Japan

[73] Assignee: Nissan Motor Company, Limited, Yokohama, Japan

[21] Appl. No.: 61,175

[22] Filed: Jul. 27, 1979

[30] Foreign Application Priority Data

Aug. 5, 1978 [JP] Japan .......................... 53-107058[U]

[51] Int. Cl.³ ....................... F16J 15/10; B65D 25/40
[52] U.S. Cl. ................................ 220/85 F; 220/85 S; 220/86 R; 280/5 A; 296/1 C; 277/105; 277/166; 277/178
[58] Field of Search ................ 220/85 SP, 85 F, 85 S, 220/86 R, 86 AT; 280/5 A; 296/1 C; 277/105, 106, 166, 178

[56] References Cited

U.S. PATENT DOCUMENTS

| 2,224,385 | 12/1940 | Greenberg | 220/86 AT |
| 3,159,409 | 12/1964 | Koehler | 296/1 C X |
| 4,079,952 | 3/1978 | Nishio et al. | 220/86 R X |

FOREIGN PATENT DOCUMENTS 2550950  5/1977  Fed. Rep. of Germany ......... 220/85 S Primary Examiner—Robert S. Ward, Jr.

[57] ABSTRACT

An improved sealing structure for receiving a gas-filler hose in a vehicle is described. The sealing structure comprises a neck member having pair of stepped flange portions. Annular sealing members are applied on respective flange portions and clamped between the respective flange portions and a gas-filler base and an outer panel of a rear wheel housing.

4 Claims, 3 Drawing Figures

SEALING STRUCTURE FOR RECEIVING GAS-FILLER HOSE IN A VEHICLE

BACKGROUND OF THE INVENTION

The present invention relates to a sealing structure of a connect-through of a vehicle body through which a gas-filler hose passes so as to introduce one end thereof into the interior of the vehicle.

Various constructions of sealing structures for receiving the gas-filler hose are known from the prior art. In FIGS. 1 and 2, there are respectively illustrated constructions of conventional sealing structures for receiving the gas-filler hose provided on vehicle bodies. With respect to each sealing structure, openings for the gas-filler hose to pass therethrough are formed on a respective gas-filler base and outer panel on the rear wheel housing. The gas-filler hose is arranged on the exterior of the vehicle, and one end of the hose is introduced into the interior of the vehicle body.

In FIG. 1, a gas-filler base 10 is welded to an outer panel 12 of a rear wheel housing by spot welding. A gas-filler hose 14 extends through openings 16, 18 respectively provided on the gas-filler base 10 and outer panel 12 in alignment relative to one another. On the end of the hose 14, is secured a neck member 20 having a flange portion 22 by which the neck member 20 is fixed to the gas-filler base 10 by means of bolts 24, with a rubber seal 26 interposed therebetween.

Further, there is illustrated another construction of a sealing structure in FIG. 2. A rubber seal 30 is engaged with openings 32, 34 respectively formed on a gas-filler base 36 and an outer panel 38 of a rear wheel housing. A spring 40 is connected to the rubber seal 30 at the intermediate portion between the gas-filler base 36 and outer panel 38 in order to bias the rubber seal 30 outwardly. A gas-filler hose 42 passes through the rubber seal 30 while elastically contacting the rubber seal 30 adjacent one end thereof for gas-seal purposes.

Both of the aforementioned constructions of conventional sealing structures suffer from difficulties in that the former requires high accuracy in the parts to be welded and may produce unevenness in the outer surface of the panels as a result of the spot welding process, while the latter involves difficulty in mounting the rubber seal 30 which may cause an unsatisfactory sealing effect.

Therefore, the present invention eliminates the above-mentioned disadvantages and difficulties of conventional sealing structures by providing a sealing structure having a plurality of different sealing members co-operating with each other.

SUMMARY OF THE INVENTION

It is an object of the present invention to provide a sealing structure which can be assembled easily and completely effect a gas seal.

Another object of the invention is to provide a sealing structure having two different sealing members one of which prevents gas-leakage into the interior of the vehicle and the other of which prevents an ingress of muddy water into the interior of the vehicle.

A further object of the invention is to provide a sealing structure having a neck member which is provided with stepped flange portions so as to mount the sealing members thereon.

To achieve the above-mentioned objects and advantages, the sealing structure for a connect-through of a vehicle body through which a gas-filler hose passes, in accordance with the present invention, comprises a neck member adapted to be fitted into the openings formed on a gas-filler base and an upper panel of a rear wheel housing and onto one end of the gas-filler hose; a pair of stepped flange portions extended outwardly from the neck member in concentric relationship with the annular portion thereof; first and second sealing members, both of annular configuration being applied to respective outer surfaces of the flange portions and respectively faced to surround the openings of the gas-filler base and outer panel of the rear wheel housing. The opening of the upper panel of the rear wheel housing is adapted to receive the upper flange portion therethrough so as to face the upper flange surface to the inner surface of the gas-filler base with the first sealing member interposed therebetween.

Preferably, the first and second sealing members are rubber seals of different hardness.

The other objects, features and advantages of the invention will be described hereafter.

BRIEF DESCRIPTION OF THE DRAWINGS

The present invention will be illustrated more fully by way of example with reference to the accompanying drawings in which.

DESCRIPTION OF THE PREFERRED EMBODIMENT

Figure 1:
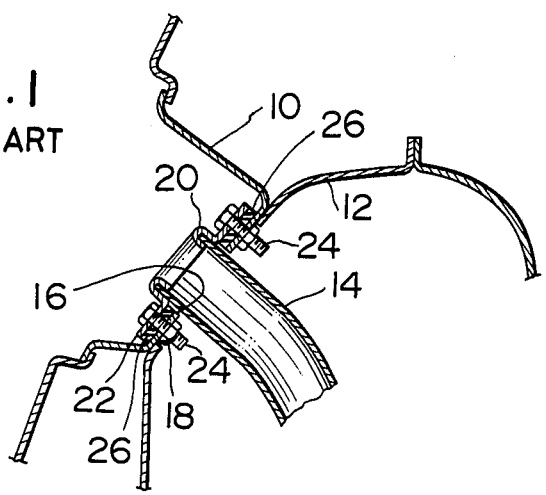
FIG. 1 is a fragmentary cross-section of one of the constructions of a sealing structure in the prior art.
Figure 2:
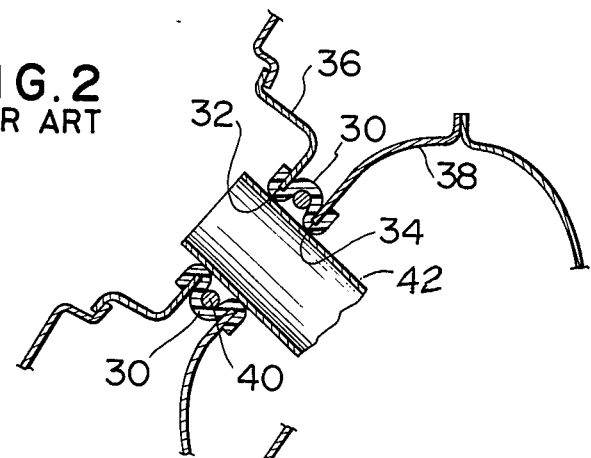
FIG. 2 is a fragmentary cross-section of another construction of a conventional sealing structure.
Figure 3:
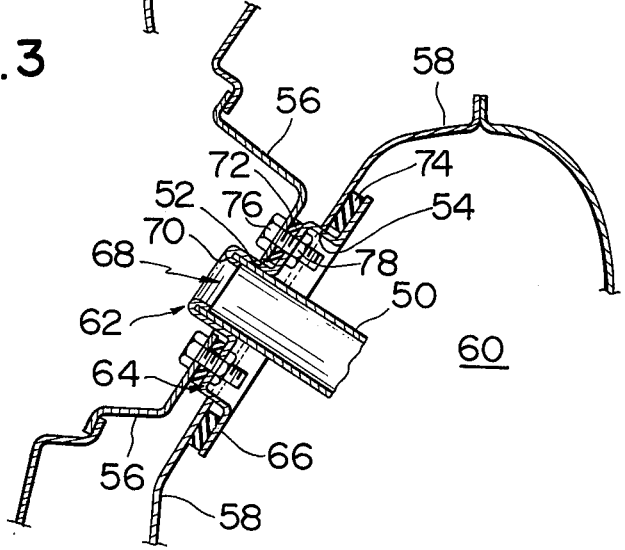
FIG. 3 is a fragmentary cross-section of a sealing structure in accordance with the present invention.

Referring to FIG. 3, there is illustrated a sealing structure for a connect-through to receive a gas-filler hose, in accordance with the preferred embodiment of the invention.

A gas-filler hose 50 is generally arranged on the exterior of a vehicle body and introduced at one end thereof into the vehicle body through openings 52, 54 respectively formed on a gas-filler base 56 and an outer panel 58 of rear wheel housing 60. A neck member 62 is lipped over the end of the gas-filler hose 50 so as to constitute a subassembly. The neck member 62 is formed with a pair of stepped flange portions comprising an inner and higher level flange portion 64 (hereafter referred to as a first flange portion) and an outer and lower level flange portion 66 (hereafter referred to as a second flange portion) which are annular and in substantially concentric configurations about a circular opening 68 defined by the lipped portion 70.

A first rubber seal 72 and second rubber seal 74 respectively having annular configurations are applied to the first and second flange portions. Practically, it should be noted that the first and second rubber seals 72 and 74 have different hardness; for example, the first rubber seal 72 is relatively harder than the second rubber seal 74. Employment of the rubber seals of different hardness is advantageous in that they can effectively co-operate to eliminate both gas-leakage and ingress of muddy water into the interior of the vehicle.

The opening 54 of the outer panel 58 of the rear wheel housing 60 can receive the first flange portion 64 therethrough. The first flange portion 64 passes through the opening 54 to face the inner surface of the gas-filler base 56 with the first rubber seal interposed therebetween and elastically secured onto the gas-filler base 56 by bolts 76 and nuts 78. Thereupon, the second flange portion 66 of the neck member 62 is urged into abutment against the inner surface of the outer panel 58 of rear wheel housing 60 with rubber seal 74, elastically situated therebetween.

The first rubber seal 72 which is clamped between the gas-filler base 56 prevents a flow of gas into the interior of the vehicle when gas is injected. While, the second rubber seal clamped between the outer panel 58 and the second flange portion 66 prevents an ingress of muddy water into the interior of the vehicle which may be driven around the rear wheel housing 60 during the running of the vehicle.

It should be understood that the first and second rubber seals need not be formed of a rubber materials. It should be apparent that synthetic rubber can be used. Alternatively, any seal member may be used such as one formed of a synthetic resin having a suitable elasticity and water resistance. The different hardnesses of the first and second rubber seals is effective for accomodating any variations in the accuracy of parts, thus assuring reliable sealing effects.

What is claimed is:

1. In a sealing structure for receiving a gas-filler hose and securing hose on a gas-filler hose on a gas-filler base and an outer panel of a rear wheel housing,
   with openings respectively formed on the gas-filler base and the outer panel in alignment defining a connect-through for the gas-filler hose,
   a neck member mounted to said gas-filler hose and having flange portions to be secured onto the gas-filler base, and
   annular elastical sealing members applied on the flange portions and clamped between the flange portions and the gas-filler base,
   the improvement comprising: a pair of stepped flange portions comprising an inner and higher leveled first flange portion and an outer and lower leveled second flange portion provided on said neck member in concentric relationship;
   first and second annular sealing members respectively applied on said first and second flange portions;
   said first flange portion with said first sealing member passing through an opening formed in the outer panel of the rear wheel housing so as to be abutted against the gas-filler base and clamp said first sealing member therebetween, and,
   said second flange portion with said second sealing member being abutted against the inside of the outer panel of the rear wheel housing and clamping said second sealing member therebetween.

2. Sealing structure according to claim 1, wherein said first and second sealing members are of different hardness.

3. Sealing structure according to claim 1 or 2, wherein said first and second sealing members are rubber.

4. Sealing structure according to claim 1, wherein said first flange portion is secured onto the inner surface of the gas-filler base by means of bolts and nuts.

* * * * *